United States Patent
DiTommaso et al.

(10) Patent No.: US 6,650,344 B1
(45) Date of Patent: Nov. 18, 2003

(54) METHOD AND SYSTEM FOR DISPLAYING COMPUTER DOCUMENTS

(75) Inventors: Dean C. DiTommaso, Endwell, NY (US); Ralph Hodgson, Port Ludlow, WA (US); James H. Switzer, Jr., Candor, NY (US); Janet E. Thomas, Endicott, NY (US); Barbara Q. Tiffany, Endicott, NY (US); Donald P. Wilton, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,413

(22) Filed: Nov. 29, 1999

(51) Int. Cl.[7] .............................................. G06F 17/27
(52) U.S. Cl. ...................................... 345/762; 707/512
(58) Field of Search ................................ 345/853, 854, 345/762; 707/512, 513, 5, 9

(56) References Cited

U.S. PATENT DOCUMENTS

| | | | |
|---|---|---|---|
| 4,428,065 A | 1/1984 | Duvall et al. | |
| 4,930,071 A | 5/1990 | Tou et al. | |
| 5,345,551 A | 9/1994 | Shelley et al. | |
| 5,379,366 A | 1/1995 | Noyes | |
| 5,708,806 A | 1/1998 | DeRose et al. | |
| 5,760,770 A | 6/1998 | Bliss et al. | |
| 5,905,992 A | 5/1999 | Lucas et al. | |
| 6,023,715 A | * 2/2000 | Burkes et al. | 707/514 |
| 6,175,830 B1 | * 2/2001 | McIntosh | 707/5 |
| 6,185,576 B1 | * 2/2001 | McIntosh | 707/200 |
| 6,336,123 B2 | * 1/2002 | Inoue et al. | 707/513 |

* cited by examiner

*Primary Examiner*—Cao (Kevin) Nguyen
(74) *Attorney, Agent, or Firm*—Scully, Scott, Murphy & Presser; William E. Scheisser

(57) ABSTRACT

A method of and a system for displaying computer documents. The method comprises the steps of identifying a base document a plurality of times in a view, each of said plurality of times being associated with a respective use; and for each of those uses, establishing a respective associated reference document. Each of the reference documents stores information specific to the associated use. The method further includes the step of accessing the base document via one of the times the base document is identified in the view. This accessing is done by (i) accessing the one reference document associated with said one of said times, (ii) using that one reference document to access the base document, and (iii) merging and displaying as one document contents of the base document and the use specific information from the one reference document.

10 Claims, 5 Drawing Sheets

FIG. 4
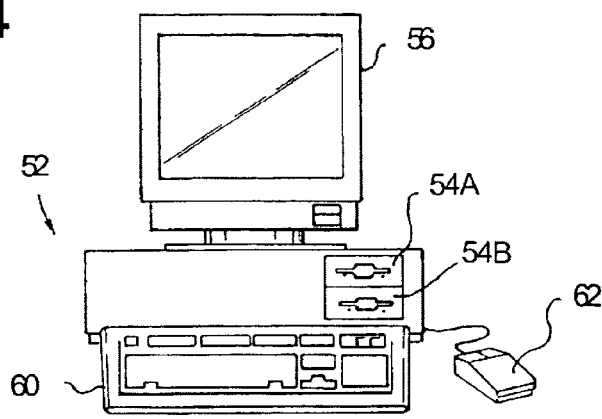
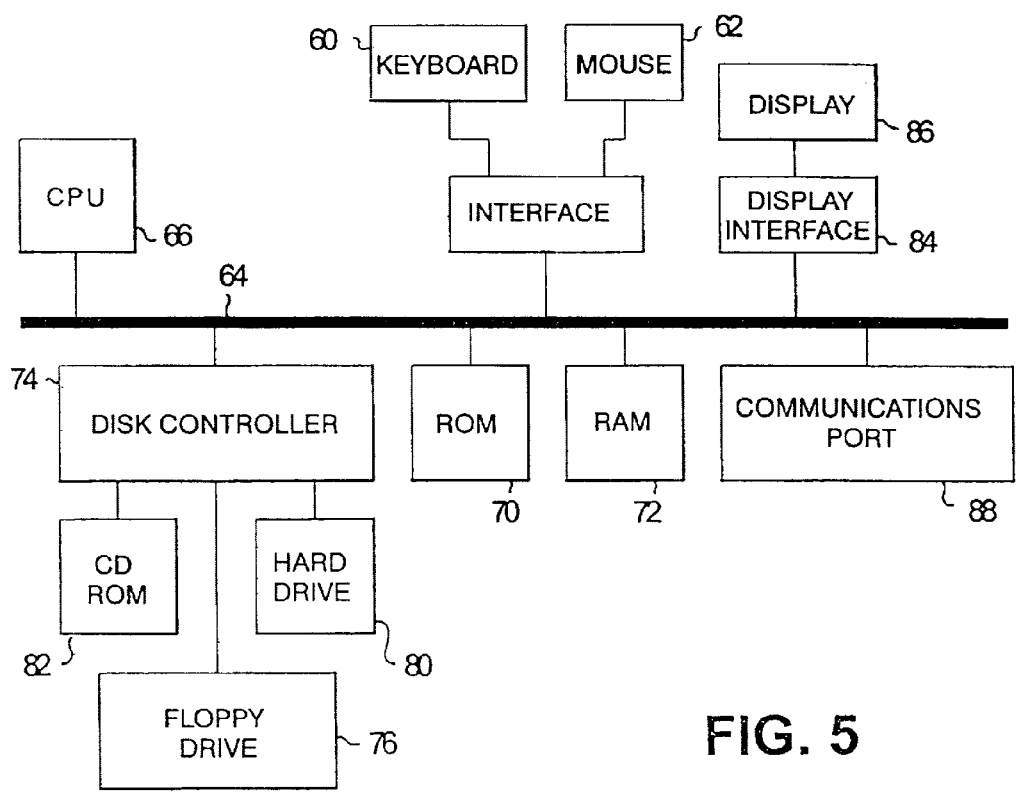
FIG. 5

METHOD AND SYSTEM FOR DISPLAYING COMPUTER DOCUMENTS

BACKGROUND OF THE INVENTION

This invention generally relates to displaying computer documents; and, more specifically, to displaying computer documents that are identified, or shown, a plurality of times in a view and accessed or opened via each appearance of the document in the view.

In various document management applications, a document may be identified or shown several times in a single view, and the document may be accessed or opened from each appearance of the document in the view. The multiple appearances of the document in the view may be associated with very similar, but often slightly different, uses or tasks.

For instance, computer programs have been developed to assist the design and development of other computer programs. As an example, these computer design assist programs may separate a project into a group of phases, and may separate each phase into a group or set of individual tasks. With some development programs, the general definitions and explanations of the tasks are repeated from phase-to-phase. Such a development program may be represented, for example, as: Phase I/tasks x, y and z; Phase II/tasks x, y and z; and Phase III/tasks x, y and z. Commonly, the development programs will have a view that shows all the phases and tasks in the project.

These development programs usually hold documents that contain a description of, and other information relating to, the individual tasks, such as those represented above as tasks x, y and z. When a particular task is being performed, the designer will typically display or look at the computer document describing the task. Commonly, these development programs will have at least one view that lists, or identifies in some abbreviated manner, all the phases and tasks in the project, and the documents describing the individual tasks may be accessed or opened from that one view.

As programs of the above-described type are being used to develop other programs, it may be desirable to record and to display information relating to specific ones of the tasks that is not the same from phase-to-phase. With many development programs, there is no easy and simple way to do this.

This could, of course, be done by making multiple copies of each task description document, so that there is a respective one basic document copy associated with each occurrence of each task. Then, if a user wanted to record information relating to a specific task occurrence, that information could be recorded in the document copy associated with that task occurrence. This approach, however, results in an unnecessarily large database.

SUMMARY OF THE INVENTION

An object of this invention is to improve procedures for displaying computer documents.

Another object of the present invention is to display multiple variations of a base or main document without requiring multiple copies of the main document.

These and other objectives are attained with a method of and a system for displaying computer documents. The method comprises the steps of identifying a base document a plurality of times in a view, each of said plurality of times being associated with a respective use; and for each of those uses, establishing a respective associated reference document. Each of the reference documents stores information specific to the associated use. The method further includes the step of accessing the base document via one of the times the base document is identified in the view. This accessing is done by (i) accessing the one reference document associated with said one of said times, (ii) using that one reference document to access the base document, and (iii) merging and displaying as one document contents of the base document and the use specific information from the one reference document.

Preferably the method further comprises the steps of storing in each of the reference documents a key identifying the base document, and establishing variables identifying the reference documents to the base document. With this preferred embodiment, the step of using the one reference document to access the main document includes the step of using the key in said one reference document to access the main document. Also the merging and displaying step includes the step of using one of these established variables to identify said one of the reference documents to the base document to enable data passing that is used to merge data from said one reference document and the base document into an integrated display of information.

Further benefits and advantages of the invention will become apparent from a consideration of the following detailed description, given with reference to the accompanying drawings, which specify and show preferred embodiments of the invention.

BRIEF DESCRIPTION OF THE INVENTION

FIGS. 4 and 5 show a computer system that may be used to practice the present invention.

DETAILED DESCRIPTION OF THE PREFERRED EMBODIMENTS

Figure 1:
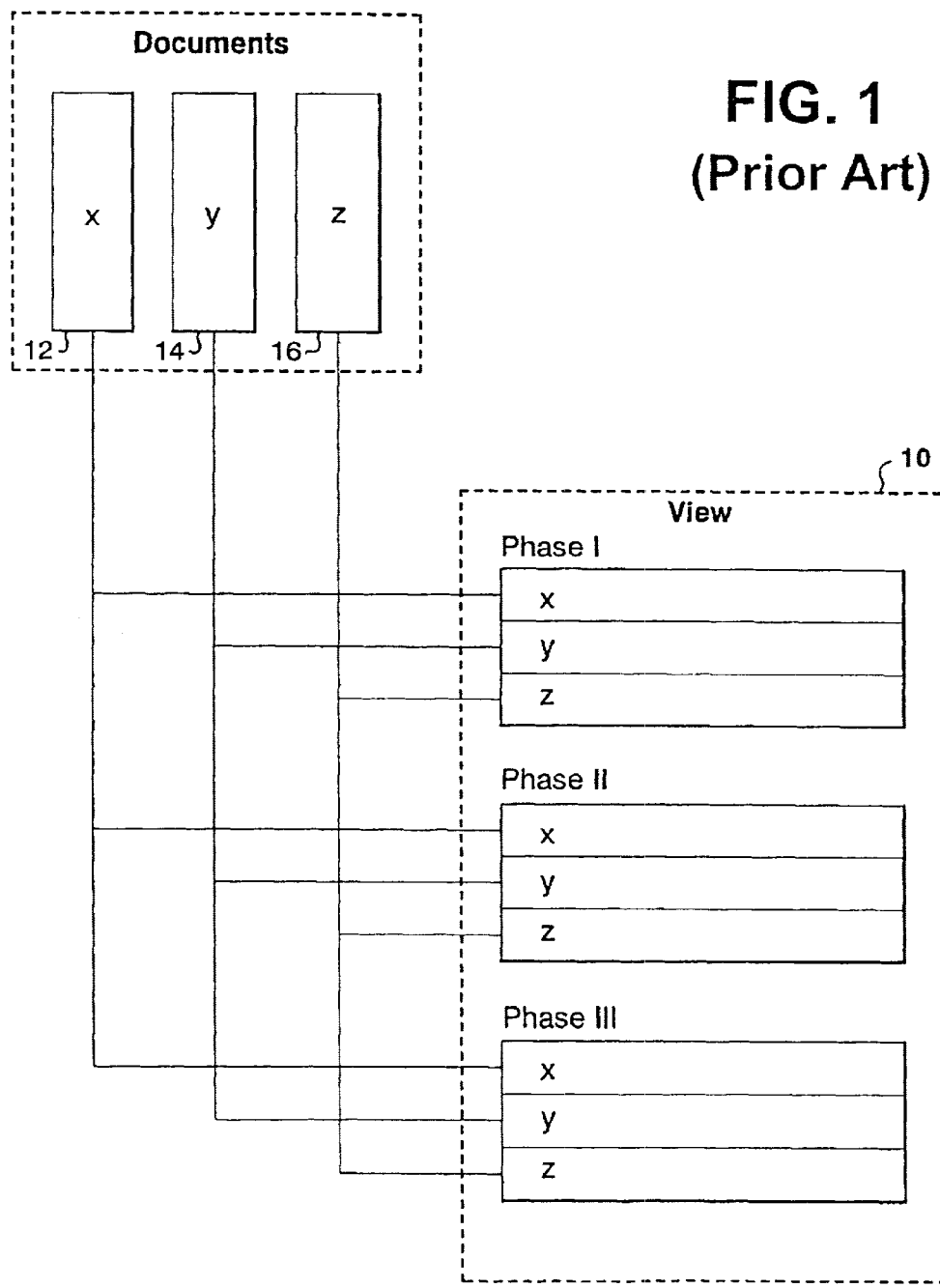
FIG. 1 illustrates a prior art procedure for opening a computer document a multitude of times from one view.

FIG. 1 illustrates a computer view 10 that identifies or shows each of various documents several times. More specifically, the particular view shown in FIG. 1 identifies documents x, y and z three times each. FIG. 1 also schematically shows these documents in full at 12, 14 and 16 respectively. For example, the view shown in FIG. 1 may represent a work project. This project is separated into a plurality of phases, I, II and III; and each of theses phases is divided into a set of tasks, x, y and z.

The documents x, y and z may give definitions and explanations of the specific work tasks or assignments x, y and z; and as the work project proceeds, the documents are opened to access the information in the documents. For instance, during Phase I of the project, document x may be opened to obtain information about task x, and then documents y and z may be opened to obtain information about tasks y and z. The same documents x, y and z may be opened during Phase II and then again during Phase III of the work project.

While the above-described procedure is often very useful, it has some limitations; and in particular, there is no easy and simple way to record and to display information relating to specific tasks or uses that is not the same from phase-to-phase. For example, a user may want certain information shown, in addition to the basic contents of document x, when the user is working on task x in Phase I of the project; and the user may want other information shown, again in addition to the basic contents of document x, when the user is working on task x of Phase II of the project.

Figure 2:
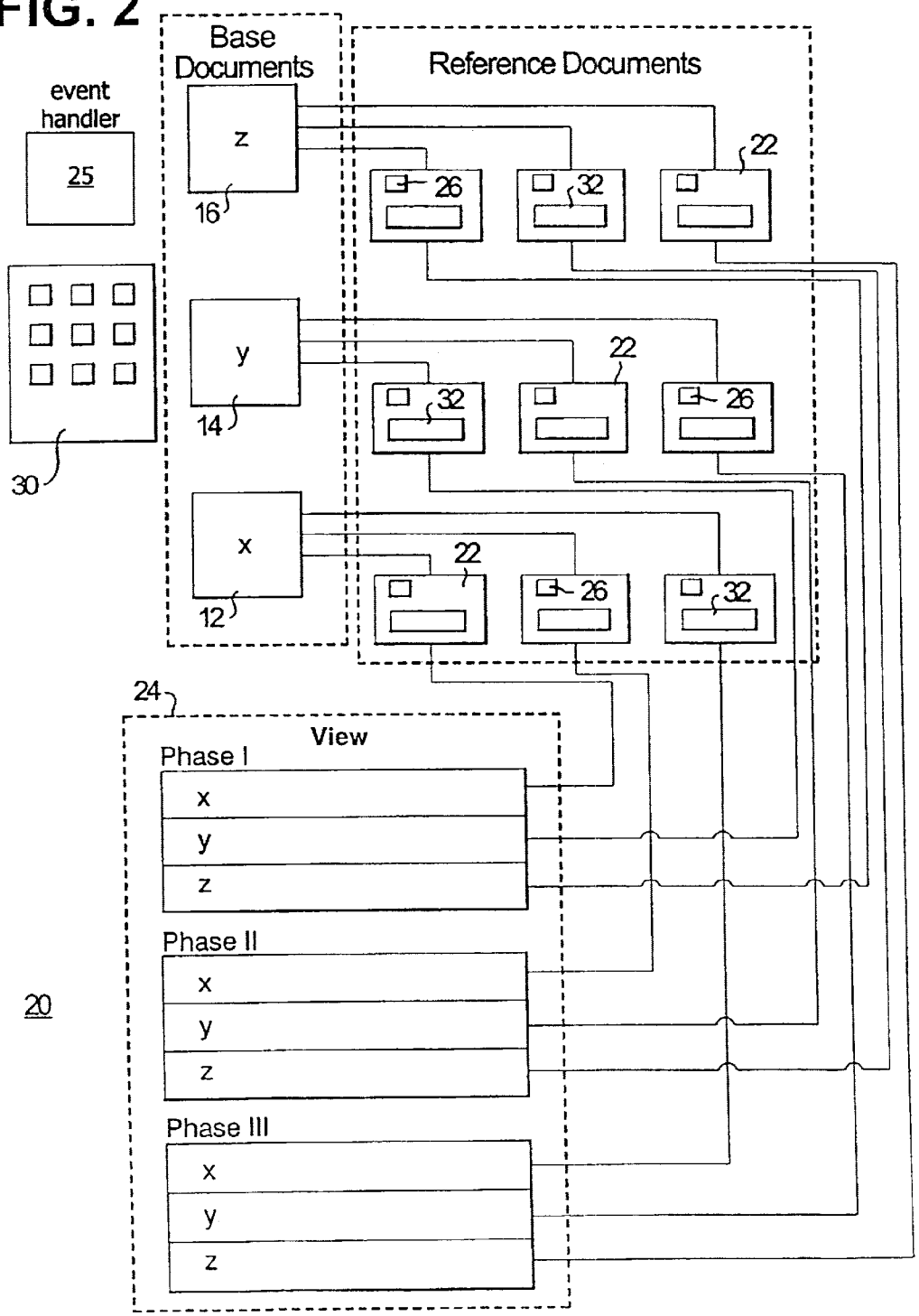
FIG. 2 illustrates a procedure embodying this invention for opening a computer document a multitude of times from one view.

FIG. 2 schematically illustrates a system 20 for displaying computer documents that addresses this limitation in accordance with a preferred embodiment of the present invention. More specifically, this preferred embodiment addresses this limitation by creating reference documents 22 containing only enough information in order to represent the document occurring more than once in the view 24. These reference documents 22 can appear many times in the view without having to contain the entire document. This reduces the size of the database.

When the reference document is opened from the view, the document that is represented by the reference document is opened. To the user, this appears as if they are always opening the document that contains all of the information. This also allows for a single point of editing so that changes do not have to be propagated everywhere the document is referenced in the view.

Preferably, an event handler 25 is used to open the base document when a reference document is opened. As described above, the reference documents contain only enough information in order to represent the document occurring more that once in the view 24. These reference documents, it should be noted, may contain more than this information.

Unique document keys 28 are used to preserve the relationship between the reference document and the base document. An environment variable 30 is used to identify the reference document to the main document, enabling data passing which is used to merge data from the reference document and the main document into an integrated display of information. The data from the reference document are schematically represented at 32 in FIG. 2.

Preferably, these environment variables 30 are created when a reference document is opened, and these variables are maintained for the duration of the display of the reference document. The environment variables 30 may be stored in any suitable memory area.

Figure 3:
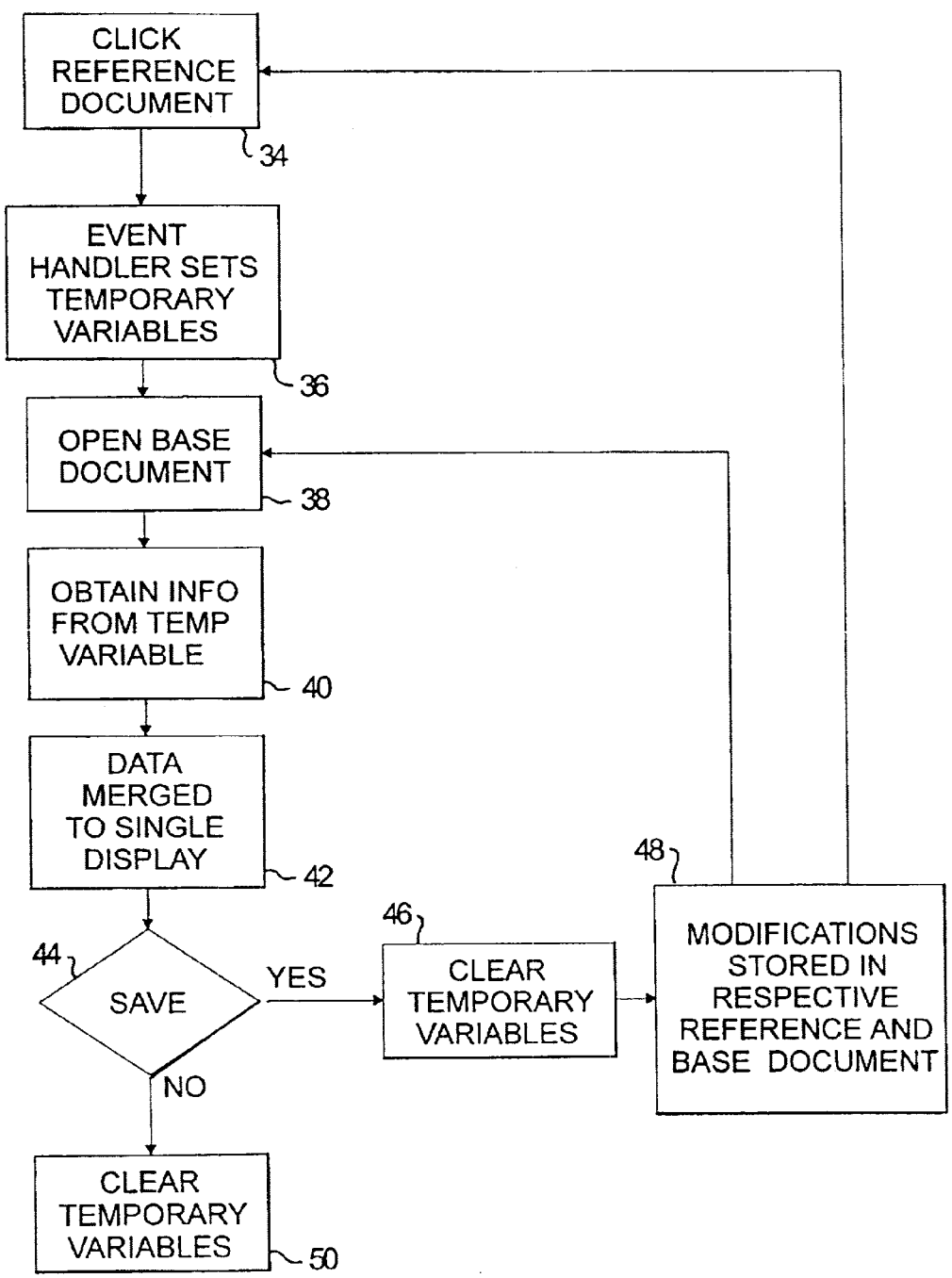
FIG. 3 is a flow chart outlining a procedure for opening and merging data from documents shown in FIG. 2.

FIG. 3 illustrates more specifically a preferred procedure for merging data from a base document and a reference document. At step 34, the reference document is opened. This may be done via a standard procedure using a computer graphics display and referred to as clicking on the reference document. At step 36, the event handler sets the temporary environment variables 30; and, at step 38, the event handler opens the base document. Then, at step 40, the temporary environment variables are used to obtain data from the reference document; and, at step 42, this data from the reference document is merged with data from the base document, and these data are merged to a single display that may then be shown.

Step 44 represents the option that the user has to save this display. If the user decides to save the display, then the routine proceeds to steps 46 and 48. At step 46, the temporary environment variables are cleared. At step 48, modifications made to the reference and base documents are stored in the respective documents. If, at step 44, the user decides not to save the display, then the environment variables are cleared, as represented by step 50.

With the above-described procedure of this invention, document hierarchy can be properly displayed, and updates to common content automatically applies to all occurrences. In addition, when a reference document is opened, it appears as if it contains all of the data including what is contained in the base document. The present invention allows access to the common data through the base document accessible from another view, and allows references to be manipulated independently of the base document.

The present invention may be used in many different specific applications. The need for a text framework, or boilerplate, that has general text into which situation specific information is inserted is common in information systems. This is typical of form processing and surveys where there are question and answer sections.

FIG. 4 illustrates a computer of a type suitable for carrying out the invention. Viewed externally in FIG. 4, a computer system has a central processing unit 52 having disk drives 54A and 54B. Disk drive indications 54A and 54B are merely symbolic of a number of disk drives that might be accommodated by the compute system. Typically, these would include a floppy disk drive such as 54A, a hard disk drive (not shown externally) and a CD ROM drive indicated by slot 54B. The number and type of drives varies, usually, with different computer configurations. The computer has the display 56 upon which information is displayed. A keyboard 60 and a mouse 62 are normally also available as input devices.

FIG. 5 shows a block diagram of the internal hardware of the computer of FIG. 4. A bus 64 serves as the main information highway, interconnecting the other components of the computer. CPU 66 is the central processing unit of the system, performing calculations and logic operations required to execute programs. Read only memory 70 and random access memory 72 constitute the main memory of the computer. Disk controller 74 interfaces one or more disk drives to the system bus 64. These disk drives may be floppy disk drives, such as 76, internal or external hard drives, such as 80, or CD ROM or DVD (Digital Video Disks) drives, such as 82. A display interface 84 interfaces a display 86 and permits information from the bus to be viewed on the display. Communications with external devices can occur over communications port 88.

Figure 6:
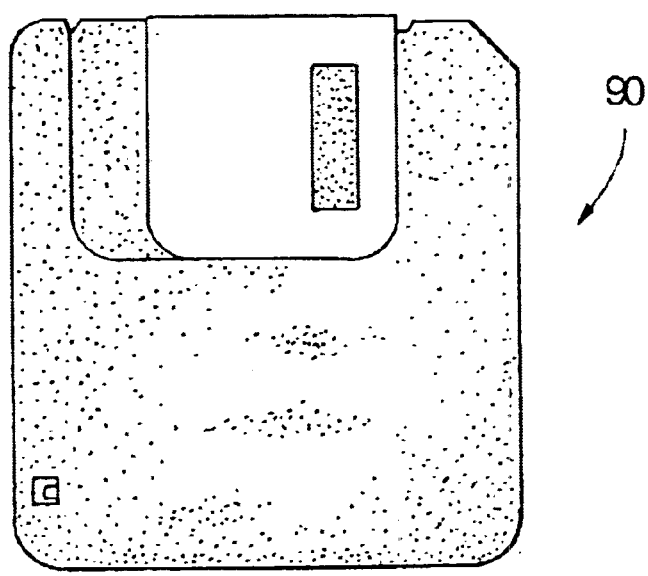
FIG. 6 shows a memory medium that can be used to hold a computer program for carrying out this invention.

FIG. 6 illustrates an exemplary memory medium 90 that can be used with drives such as 76 in FIG. 5 or 54A in FIG. 4. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of displaying a base document a plurality of times in a single view, comprising the steps of:

creating a respective one reference document for each of said plurality of times the base document is displayed in said single view; storing data in each of said reference documents; storing keys in said reference documents, wherein said keys point to said base document; and providing an event handler and using the event handler to open said reference documents into a hidden view and thereafter using the keys in the reference documents to open said base document, including the steps of (i) accessing the reference documents via the displays of the base documents, (ii) using the keys in the accessed reference documents to access the base document, (iii) merging contents of the reference documents and the base document to obtain customized documents, and (iv) showing the customized documents in said view.

2. A method of displaying computer documents, comprising the steps of:

identifying a base document a plurality of times in a single view, each of said plurality of times being associated with a respective use;

for each of said uses, establishing a respective associated reference document; storing in each of the reference documents information specific to the associated use; and accessing the base document via one of the times the base document is identified in the single view, including the steps of
i) accessing the one reference document associated with said one of said times the base document is identified in said single view,
ii) using said one, accessed reference document to access the base document, and
iii) merging and displaying as one customized document contents of the base document and said use specific information from said one, accessed reference document.

3. A method according to claim 2, further comprising the step of storing in each of the reference documents a key identifying the base document, and wherein the step of using said one reference document to access the base document includes the step of using the key in said one reference document to access the base document.

4. A method according to claim 3, further including the step of establishing variables identifying the reference documents to the base document, and wherein the merging and displaying step includes the step of using one of the variables to identify said one of the reference documents to the base document to enable data passing that is used to merge data from said one reference document and the base document into an integrated display of information.

5. A system for displaying computer documents, comprising:

means for identifying a base document a plurality of times in a single view, each of said plurality of times being associated with a respective use;

means for establishing, for each of said uses, a respective associated reference document;

means for storing in each of the reference documents information specific to the associated use; and means for accessing the base document via one of the times the base document is identified in the single view, including
i) means for accessing the one reference document associated with said one of said times the base document is identified in said single view,
ii) means for using said one, accessed reference document to access the base document, and
iii) means for merging and displaying, as one, accessed customized document, contents of the base document and said use specific information from said one reference document.

6. A system according to claim 5, further comprising means for storing in each of the reference documents a key identifying the base document, and wherein the means for using said one reference document to access the base document includes means for using the key in said one reference document to access the base document.

7. A system according to claim 6, further comprising means for establishing variables identifying the reference documents to the base document, and wherein the merging and displaying means includes means for using one of the variables to identify said one of the reference documents to the base document to enable data passing that is used to merge data from said one reference document and the base document into an integrated display of information.

8. A program storage device readable by a machine, tangibly embodying a program of instructions executable by the machine to perform method steps for displaying computer documents, said method steps comprising:

identifying a base document a plurality of times in a single view, each of said plurality of times being associated with a respective use;

for each of said uses, establishing a respective associated reference document;

storing in each of the reference documents information specific to the associated use; and accessing the base document via one of the times the base document is identified in the single view, including the steps of
i) accessing the one reference document associated with said one of said times the base document is identified in said single view,
ii) using said one accessed reference document to access the base document, and
iii) merging and displaying, as one, accessed customized document, contents of the base document and said use specific information from said one reference document.

9. A program storage device according to claim 8, wherein said method steps further comprise the step of storing in each of the reference documents a key identifying the base document, and wherein the step of using said one reference document to access the base document includes the step of using the key in said one reference document to access the base document.

10. A program storage device according to claim 9, wherein said method steps further comprise the step of establishing variables identifying the reference documents to the base document, and wherein the merging and displaying step includes the step of using one of the variables to identify said one of the reference documents to the base document to enable data passing that is used to merge data from said one reference document and the base document into an integrated display of information.

* * * * *